United States Patent
Kaya

(10) Patent No.: US 11,641,056 B2
(45) Date of Patent: May 2, 2023

(54) FLIGHT VEHICLE AND COMMUNICATION SYSTEM

(71) Applicant: WaveArrays, Inc., Hyogo (JP)

(72) Inventor: Nobuyuki Kaya, Hyogo (JP)

(73) Assignee: WaveArrays, Inc., Hyogo (JP)

( * ) Notice: Subject to any disclaimer, the term of this patent is extended or adjusted under 35 U.S.C. 154(b) by 0 days.

(21) Appl. No.: 17/633,867

(22) PCT Filed: Aug. 6, 2021

(86) PCT No.: PCT/JP2021/029260
§ 371 (c)(1),
(2) Date: Feb. 8, 2022

(87) PCT Pub. No.: WO2022/158011
PCT Pub. Date: Jul. 28, 2022

(65) Prior Publication Data
US 2022/0376383 A1    Nov. 24, 2022

(30) Foreign Application Priority Data

Jan. 25, 2021 (JP) .............................. JP2021-009246

(51) Int. Cl.
*H01Q 1/28* (2006.01)
*H01Q 21/08* (2006.01)
(Continued)

(52) U.S. Cl.
CPC .............. *H01Q 1/28* (2013.01); *B64C 39/024* (2013.01); *H01Q 21/08* (2013.01); *B64U 10/13* (2023.01); *B64U 2101/00* (2023.01)

(58) Field of Classification Search
CPC .......... H01Q 1/28; H01Q 1/282; H01Q 21/08; H01Q 21/28
See application file for complete search history.

(56) References Cited

U.S. PATENT DOCUMENTS

2017/0029107 A1   2/2017   Emami et al.
2018/0183496 A1   6/2018   Gasnier et al.
(Continued)

FOREIGN PATENT DOCUMENTS

CN   111431641    7/2020
JP   2013107496 A 6/2013
(Continued)

*Primary Examiner* — Lam T Mai
(74) *Attorney, Agent, or Firm* — Simpson & Simpson, PLLC; S. Peter Konzel

(57) ABSTRACT

[Problems to be Solved]
To provide a flight vehicle and a communication system which can relay communications between transmission and reception antennae that are located farther from each other by using antennae capable of receiving information transmitted from a transmission antenna located in a wider range than a range of a linear directed antenna can receive.

[Solution]
A flight vehicle 1 according to the present invention comprises one or more linear array antennae (antennae 4); and a controller 2 configured to be capable to execute: a process of receiving information by one or more of the antennae 4, a process of outwardly transmitting said information by one or more of the antennae 4. In the communication system C of the present invention, which includes said flight vehicle 1, the transmission antenna T1 and the reception antenna R1 differ from each other. In the flight vehicle 1 of the present invention, it is preferable that the antennae 4 that receives the information and the antennae 4 that transmits the information differ from each other.

15 Claims, 7 Drawing Sheets

(51) Int. Cl.
*B64C 39/02* (2023.01)
*B64U 10/13* (2023.01)
*B64U 101/00* (2023.01)

(56) References Cited

U.S. PATENT DOCUMENTS

| | | | | |
|---|---|---|---|---|
| 2019/0389578 | A1* | 12/2019 | Lim | G05D 1/101 |
| 2021/0024211 | A1* | 1/2021 | Peitzer | H01Q 3/24 |
| 2021/0313669 | A1* | 10/2021 | Ananth | H01Q 1/1292 |
| 2022/0069449 | A1* | 3/2022 | Xue | H01Q 21/205 |
| 2022/0196818 | A1* | 6/2022 | Kaya | G01S 7/03 |
| 2022/0196820 | A1* | 6/2022 | Kaya | H01Q 3/26 |

FOREIGN PATENT DOCUMENTS

| | | | | |
|---|---|---|---|---|
| JP | 2019125877 | A | | 7/2019 |
| JP | 2020080459 | A | | 5/2020 |
| WO | WO-2020204887 | A1 | * | 10/2020 ........... H04B 7/0617 |

* cited by examiner

FLIGHT VEHICLE AND COMMUNICATION SYSTEM

TECHNICAL FIELD

The present invention relates to a flight vehicle and a communication system.

BACKGROUND ART

In communication using radio waves, a radio wave repeater may receive the information transmitted by a transmission antenna and the repeater may transmit said information to a reception antenna, so-called relaying. Relaying enables that the reception antenna may receive the information transmitted by the transmission antenna through the repeater, even if the reception antenna cannot directly receive the information transmitted by the transmission antenna. When using a repeater to relay communication between a transmission antenna and a reception antenna located far from each other, it is preferred that the repeater can receive information transmitted by the transmission antenna in a wider area.

By directing antennae, information from a farther transmission antenna can be received. With respect to directing antennae, linear directed antennae are known, as exemplified by parabolic antenna and planar phased array antenna. By using a linear directed antenna, information transmitted from a transmission antenna located in a linear range can be received.

As an example of the measures to receive information from antennae located in wider range than linear range, Non-Patent Literature 1 discloses a phased-array antenna that is configured by using eight poles having a multitude of antenna elements.

CITATION LIST

Non-Patent Literature

Non-Patent Literature 1: Nobuyuki Kaya, "NEW RECEIVING GROUND ANTENNA USING ACTIVE PHASED ARRAY ANTENNA FOR SATELLITES", (In proceedings of "67th International Astronautical Congress (IAC 2016)"), 2016, p 3159-3162.

SUMMARY OF THE INVENTION

Problems to be Solved by the Invention

According to Non-Patent Literature 1, since eight poles having a multitude of antenna elements are used as a receiving ground antenna, it is possible to receive information transmitted from transmission antenna located in a wider range than a linear range. This means that information transmitted by a wide range of transmission antenna can be received at any timing.

Shields, exemplified by buildings and terrain, can interfere radio waves. By mounting the antenna on a flight vehicle, it is possible to prevent the radio waves containing the information to be received by the antenna from being interfered by shields. However, the receiving ground antenna in the Non-Patent Literature 1 is a relatively large antenna installed on the ground. The weight of the antenna mounted on the flight vehicle can be limited by the lift forces that the flight vehicle can generate or other factors. There are also issues related to the shape of the antenna when it is mounted on a flight vehicle. The shape of the antenna on the flight vehicle can be limited by the aerodynamic characteristics required of the flight vehicle or other factors. Therefore, it is not easy to mount the receiving ground antenna of Non-Patent Literature 1 on a flight vehicle while satisfying the restrictions on weight and/or shape in the case of mounting the antenna on a flight vehicle.

In relaying, there are also issues related to the transmission of information. If the information can be transmitted to a reception antenna in a wider range, the repeater can relay communications between a transmission antenna and a reception antenna that are located farther from each other. Hence, there is a further problem to be solved when the Non-Patent Literature 1 transmits information to a reception antenna in a wider range.

The present invention has been made in view of such circumstances. An objective of the present invention is to provide a flight vehicle and a communication system which are able to relay communications between transmission antennae and reception antennae that are located farther from each other by using antennae capable of receiving information transmitted from a transmission antenna located in a wider range than a range where a linear directed antenna can receive.

Means for Solving the Problems

As a result of diligent study of the aforementioned problems, the inventors have found that it is possible to achieve the aforementioned objective by making processes feasible, and have completed the present invention, the processes including one or more linear array antennae receiving the information; one or more linear array antenna outwardly transmitting said information. Specifically, the present invention provides the following.

An invention according to a first characteristic provides a flight vehicle comprising: one or more linear array antennae; and a controller, wherein the controller is configured to be capable to execute: a process of receiving information by one or more antennae of said linear array antennae, a process of outwardly transmitting said information by one or more antennae of said linear array antennae.

There are antennae that are directed to a linear range, exemplified by parabolic antennae and planar phased array antennae. Antennae that are directed to a linear range can receive information transmitted from sources located in the linear range. In contrast to this, it is possible to use a linear array antenna by directing the linear array antenna to a conical range, a central axis of the conical range being a longitudinal direction of the antenna. The "conical range" as used herein is an area that includes a side surface of a cone and areas near the side surface and that does not include the bottom nor the inside of the cone.

According to the invention related to the first characteristic, since the process of receiving information by linear antennae can be executed, it can receive information which is transmitted from sources located in a conical range which is wider than a linear range. Further, according to the invention related to the first characteristic, since the process of transmitting information by linear antennae can be executed, it can transmit information to destinations located in a conical range which is wider than a linear range.

The lift forces that the flight vehicle can generate, or other factors may limit the weight of the antenna mounted on the flight vehicle. According to the invention related to the first characteristic, since it is sufficient for the flight vehicle to comprise one or more linear array antennae and a controller, the weight limitation when antennae are mounted on a flight vehicle can be satisfied.

The aerodynamic characteristics required of the flight vehicle and other factors may restrict the shape of the antenna mounted on the flight vehicle. According to the invention related to the first characteristic, since it is sufficient to comprise one or more linear array antennae and a controller the shape limitation when antennae are mounted on the flight vehicle can be satisfied.

Shields, exemplified by buildings and terrain, can interfere radio waves. According to the invention related to the first characteristic, by the flight vehicle comprising linear array antennae, radio waves containing information transmitted and/or received by the linear array antenna can be prevented from being interfered by shields. Hence, according to the invention related to the first characteristic, linear array antennae can receive information transmitted by the transmission antenna in a wider area than when the radio waves are interfered by shields. According to the invention related to the first characteristic, linear array antennae can transmit information to reception antennae in a wider area than when the radio waves are interfered by shields.

According to the invention related to the first characteristic, it is possible to achieve both receiving information transmitted by the transmission antenna located in a wider range and transmitting information to reception antennae located in a wider range. Therefore, according to the invention related to the first characteristic, it is possible to relay information between transmission antennae and reception antennae that are located farther from each other by using antennae capable of receiving information transmitted from transmission antennae in a wider range than a range where linear directed antennae can receive.

Hence, according to the invention related to the first characteristic, it is possible to provide a flight vehicle that can relay communication between a transmission antenna and a reception antenna located far from each other, using antennae capable of receiving information transmitted from a transmission antenna located in wider range than a range where a linear directed antenna can receive.

An invention according to a second characteristic is the invention according to the first characteristic, and provides a flight vehicle wherein the linear array antennae that receives the information and the linear array antennae that transmits the information differ from each other.

When the same antenna is used to receive and transmit information simultaneously, the information to be received and the information to be transmitted may be interfered at the antenna which may adversely affect the reception and/or transmission. When the reception is adversely affected, the information transmitted from a transmission antenna located in a far position may not be received. When the transmission is adversely affected, the information may not be transmitted to a reception antenna located in a far position.

According to the invention related to the second characteristic, since the linear array antennae that receives the information and the linear array antennae that transmits the information differ from each other, it is possible to prevent interfering of receiving information and transmitting information at the linear array antennae when reception and transmission are performed simultaneously. Thus, it is possible to achieve both receiving information transmitted by a transmission antenna in a far position and transmitting information to a reception antenna in a far position. Therefore, according to the invention related to the second characteristic, it is possible to relay information between transmission antennae and reception antennae that are located farther from each other.

Hence, according to the invention related to the second characteristic, it is possible to provide a flight vehicle that can relay communication between a transmission antenna and a reception antenna located far from each other, using antennae capable of receiving information transmitted from a transmission antenna located in wider range than a range where a linear directed antenna can receive.

An invention according to a third characteristic is the invention according to the first or second characteristic, and provides a flight vehicle, wherein the process of receiving information includes a process of controlling the direction of the antennae that receives the information to the direction from the antennae to the source(s) of the information.

According to the invention related to the third characteristic, by controlling the direction of the linear array antennae that receives the information to the direction from the antennae to the source(s) of the information, it is possible to receive information which is transmitted from the source(s) located in a farther location.

Hence, according to the invention related to the third characteristic, it is possible to provide a flying vehicle that can relay communication between a transmission antenna and a reception antenna located far from each other, using antennae capable of receiving information transmitted from a transmission antenna located in wider range than a range where a linear directed antenna can receive.

An invention according to a fourth characteristic is the invention according to any of the first to third characteristics, and provides a flight vehicle wherein the process of transmitting includes a process of controlling the direction of the antennae that transmits the information to the direction from the antennae to the destination(s) of the information.

According to the invention related to the fourth characteristic, by controlling the direction of the linear array antennae that transmits the information to the direction from the linear array antennae to the destination(s) of the information, it is possible to transmit information to the destination(s) located in farther location.

Hence, according to the invention related to the fourth characteristic, it is possible to provide a flight vehicle that can relay communication between a transmission antenna and a reception antenna located far from each other, using antennae capable of receiving information transmitted from a transmission antenna located in wider range than a range where a linear directed antenna can receive.

An invention according to fifth characteristic is the invention according to any of the first to fourth characteristics, and provides the flight vehicle being a multicopter.

For receiving information transmitted with radio waves having directivity, it is preferable that the flight vehicle is at a predetermined position where enables suitable reception of said radio waves. Since the flight vehicle is at a predetermined position where enables suitable reception of said radio waves, the flight vehicle is capable of receiving information transmitted from a transmission antenna located in a farther location. However, when a flight vehicle is a balloon not having horizontally moving means, it is difficult to move into such predetermined positions.

A multicopter is a rotorcraft having three or more rotors. A multicopter is capable of climbing and/or descending by increasing or decreasing the rotational speed of the rotors. A multicopter is also capable of tilting its body by making difference between the rotational speed of each rotors. Thus, the multicopter is capable of moving forward, backward, and/or turn, etc. According to the invention related to the fifth characteristic, since the flight vehicle is a multicopter, the flight vehicle is capable of moving to a predetermined position by climbing, descending, moving forward, moving backward, and/or turning, etc.

A fixed-wing aircraft is a flight vehicle obtains lift force from fixed and/or variable wings. When a flight vehicle is a fixed-wing aircraft, the fixed-wing aircraft must continue to move in order to obtain lift force from the fixed and/or variable wings. The movement of the fixed wing aircraft may cause that the position of the fixed-wing aircraft differs from the predetermined position. A multicopter is more capable of hovering, which allows the multicopter keeping the same position in the air, than a fixed-wing aircraft obtaining lift force from fixed and/or variable wings. According to the invention related to the fifth characteristic, by the flight vehicle being a multicopter, the flight vehicle is capable of keeping the predetermined position. Thus, the flight vehicle is capable of receiving information that is transmitted from a transmission antenna located in a farther location.

When a flight vehicle is a balloon, the position of the balloon can change due to wind effects. Changing the position of the balloon may cause that the position of the balloon differs from the predetermined position. According to the invention related to the fifth characteristic, by the flight vehicle being a multicopter, the flight vehicle is capable of controlling its flight state to counteract the effects of wind. Thus, the flight vehicle is capable of keeping the predetermined position. By keeping the predetermined position, the flight vehicle is capable of receiving information that is transmitted from a transmission antenna located in a farther location.

When flight vehicle is a fixed-wing aircraft, which obtains lift force from fixed and/or variable wings, the shape of the flight vehicle may be required to be a shape being capable of obtaining enough lift force for the flight from the fixed and/or variable wings. According to the invention related to the fifth characteristic, by the flight vehicle being a multicopter, which does not require fixed and/or variable wings, it is capable of preventing shape restrictions relating to the lift force obtained from fixed and/or variable wings. Thus, according to the invention related to the fifth characteristic, it is capable of satisfying the shape restrictions when a flight vehicle mounts antennae.

Hence, according to the invention related to the fifth characteristic, it is possible to provide a flight vehicle that can relay communication between a transmission antenna and a reception antenna located far from each other, using antennae capable of receiving information transmitted from a transmission antenna located in wider range than a range where a linear directed antenna can receive.

An invention according to sixth characteristic is the invention provides a communication system comprising one or more transmission antennae capable of transmitting information; the flight vehicle according to any of the first to fifth characteristics, wherein the flight vehicle capable of receiving said information from the transmission antenna and transmitting outwardly said information received; and one or more reception antennae capable of receiving said information transmitted from the flight vehicle, wherein the transmission antennae and the reception antennae differ from each other.

According to the invention related to the sixth characteristic, it is possible to receive information transmitted by a transmission antenna located in a conical range. The conical range is wider than a linear range. Therefore, it is possible to receive information transmitted from a transmission antenna located in a wider range than a linear directed antenna can. Further, according to the invention related to the sixth characteristic, it is possible to transmit information to a reception antenna located in a conical range. Therefore, it is possible to transmit information to a reception antenna located in a wider range than a linear directed antenna can. Further, according to the invention related to the sixth characteristic, it is possible to prevent radio waves containing information transmitted and/or received from being interfered by shields. Thus, according to the invention related to the sixth characteristic, it is possible to relay information between a transmission antenna and a reception antenna, even if both antennae are different from each other and located far from each other.

Hence, according to the invention related to the sixth characteristic, it is possible to provide a communication system that can relay communication between a transmission antenna and a reception antenna located far from each other, using antennae capable of receiving information transmitted from a transmission antenna located in wider range than a range where a linear directed antenna can receive.

An invention according to seventh characteristic is the invention according to the sixth characteristics, and provides the communication system, wherein the number of transmission antennae is two or more, and the process of receiving includes: a process of controlling the direction of one or more antennae of said linear array antennae receiving said information to a direction from said antennae to one of said transmission antennae, a process of controlling the direction of one or more antennae, wherein the antennae differs from said one or more antennae and belongs linear array antennae receiving said information, to a direction from said antennae to another of said transmission antennae.

According to the invention related to the seventh characteristic, the linear array antennae that receive information can be divided into a plurality of groups corresponding to each of a plurality of transmission antennae. Then, it is possible to control each of the directions of the linear array antennae in each of these groups to the direction corresponding to the transmission antenna. Thus, even if the number of transmission antennae is two or more, it is capable of controlling the direction of at least some of the linear array antennae receiving information to the direction from the linear array antennae toward the source of the information, so that it is possible to receive information which is transmitted from a transmission antenna located farther.

Hence, according to the invention related to the seventh characteristic, it is possible to provide a communication system that can relay communication between a transmission antenna and a reception antenna located far from each other, using antennae capable of receiving information transmitted from a transmission antenna located in wider range than a range where a linear directed antenna can receive.

An invention according to eighth characteristic is the invention according to the sixth or seventh characteristics, and provides the communication system, wherein the number of reception antennae is two or more, and the process of transmitting includes: a process of controlling the direction of one or more antennae of said linear array antennae transmitting said information to a direction from said antennae to one of said reception antennae, a process of controlling the direction of one or more antennae, wherein the antennae differs from said one or more antennae and belongs linear array antennae transmitting said information, to a direction from said antennae to another of said reception antennae.

According to the invention related to the eighth characteristic, the linear array antennae that transmit information can be divided into a plurality of groups corresponding to each of a plurality of reception antennae. Then, it is possible to control each of the directions of the linear array antennae in each of these groups to the direction corresponding to the reception antennae. Thus, even if the number of reception antenna is two or more, it is capable of controlling the direction of at least some of the linear array antennae transmitting information to the direction from the linear array antennae toward the destination of the information, so that it is possible to transmit information to a reception antenna located farther.

Hence, according to the invention related to the eighth characteristic, it is possible to provide a communication system that can relay communication between a transmission antenna and a reception antenna located far from each other, using antennae capable of receiving information transmitted from a transmission antenna located in wider range than a range where a linear directed antenna can receive.

According to the present invention, it is possible to provide a flight vehicle and a communication system that can relay communication between a transmission antenna and a reception antenna located far from each other, using antennae capable of receiving information transmitted from a transmission antenna located in a wider range than a range where a linear directed antenna can receive.

MODES FOR CARRYING OUT THE INVENTION

In the following, description is given of an example of a preferred aspect for carrying out the present invention with reference to the figures. It is to be noted that this is merely an example and the technical scope of the present invention is not limited thereto.

<Communication System C>

Figure 1:
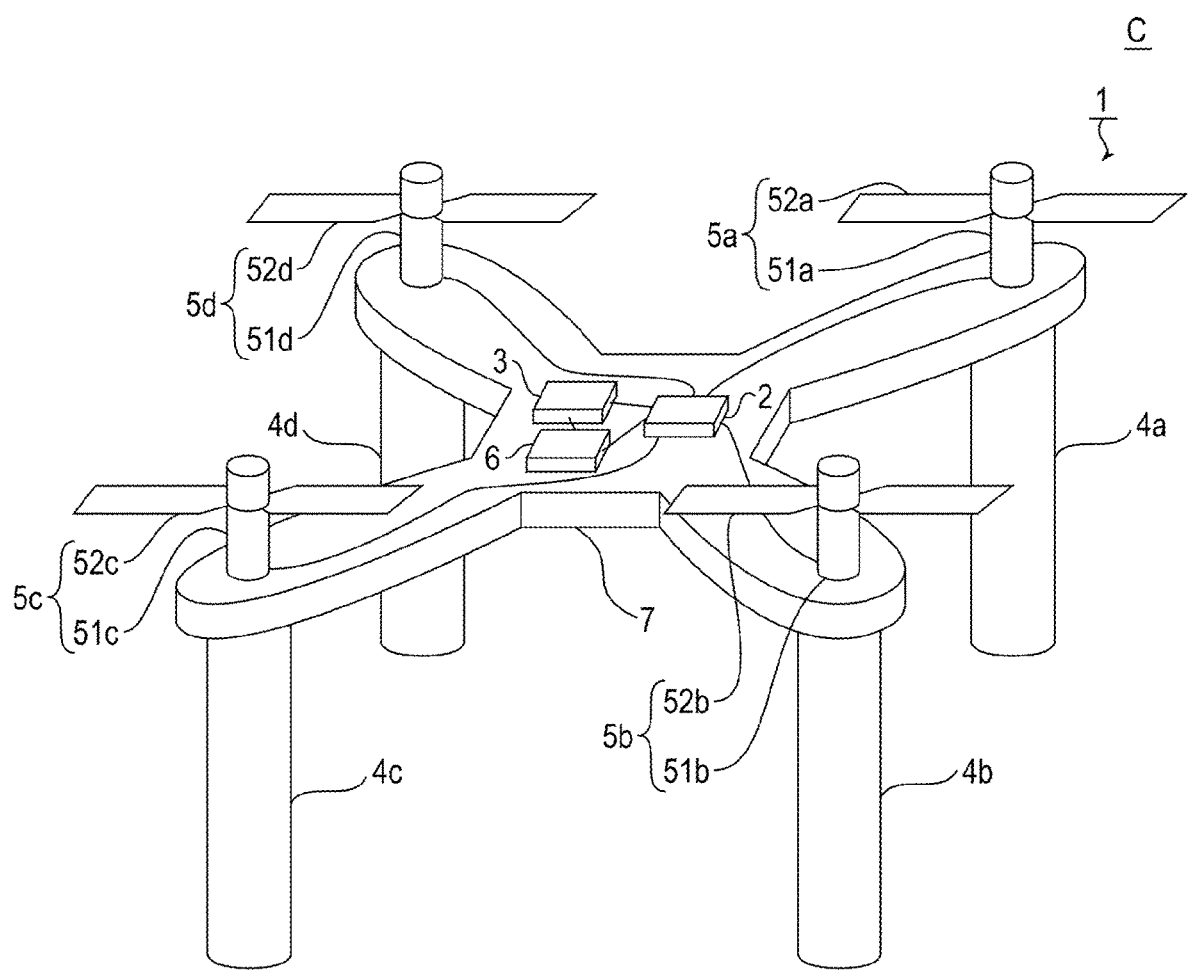
FIG. 1 is a schematic diagram of a flight vehicle 1 in an embodiment of the present invention, when it is viewed from diagonally above.
Figure 2:
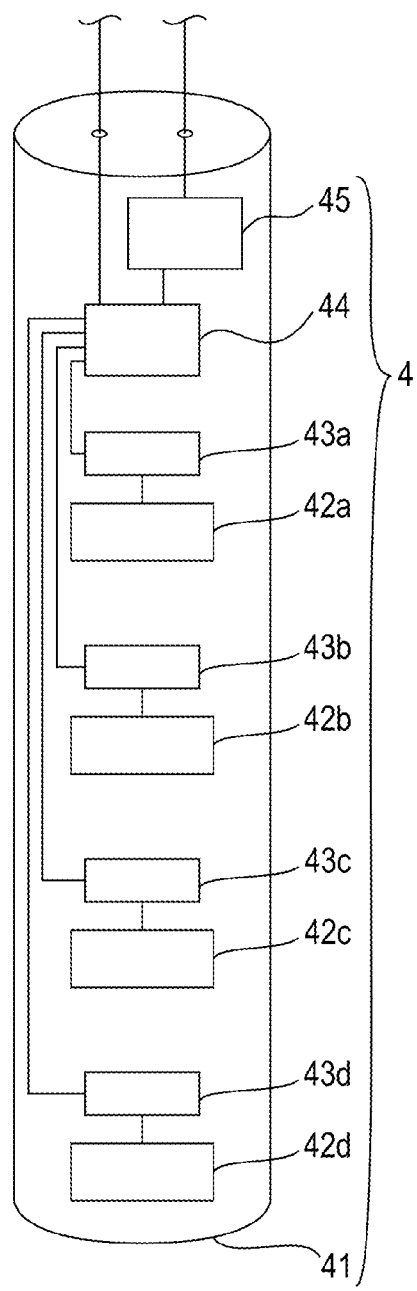
FIG. 2 is a schematic diagram of an antenna 4 in the embodiment of the present invention.

FIG. 1 is a schematic diagram of a flight vehicle 1 in an embodiment of the present invention, when it is viewed from diagonally above. FIG. 2 is a schematic diagram of an antenna 4 in the embodiment of the present invention. Hereinafter, with reference to FIG. 1 and FIG. 2, description is given of an example of a preferred configuration of the communication system C in the embodiment of the present invention.

A communication system C comprises one or more transmission antennae capable of transmitting information, a flight vehicle 1 capable of receiving information from the transmission antennae and transmitting outwardly the received information, and one or more reception antennae capable of receiving information transmitted from the flight vehicle 1. The transmission antennae and the reception antennae may differ from each other. Since the transmission antennae and the reception antennae differ from each other, the flight vehicle 1 can relay the information transmitted by the transmission antennae to the reception antennae.

[Flight Vehicle 1]

The flight vehicle 1 includes a controller 2, a transmitter 3, one or more antennae 4, a flying structure 5, and a power source 6. The flight vehicle 1 is preferably able to include a support structure 7 capable of supporting two or more components of the flight vehicle 1 in a predetermined positional relationship, although it is not an essential aspect. By inclusion of the support structure 7, it is capable of supporting components of the flight vehicle 1 so that the positional relationship of components of the flight vehicle 1 is in a predetermined positional relationship.

The flight vehicle 1 is not specially limited as long as it is capable of flight. The flight vehicle 1 may be, for example, a helicopter, a balloon, an airship, and/or a fixed-wing aircraft. The type of flight vehicle 1 being a helicopter is not specially limited. It may be a single-rotor helicopter having one rotor producing lift force, a twin-rotor helicopter with two rotors, and/or a multicopter with three or more rotors. The type of flight vehicle 1 being a fixed-wing aircraft may be a fixed-wing aircraft that uses fixed and/or variable wings to provide lift force.

Shields, exemplified by buildings and terrain, can interfere radio waves. Since the flight vehicle 1 includes antenna 4 and is capable of flight, it is possible to prevent the radio waves containing the information to be transmitted and/or received by the antenna 4 from being interfered by shields. Thus, the antenna 4 is possible to receive information transmitted by the transmission antennae in a wider area than when the radio waves are interfered by shields. Thus, the antenna 4 is possible to transmit information to the reception antennae located in a wider area than when the radio waves are interfered by shields.

According to the flight vehicle 1 of the present embodiment, it is possible to achieve both receiving information transmitted by the transmission antennae in a wider area and transmitting information to the reception antennae located in a wider area. Hence, according to the flight vehicle 1 of the present embodiment, it is possible to relay information between transmission antennae and reception antennae that are located farther from each other by using antennae 4 capable of receiving information transmitted by a transmission antenna in wider range than a range where linear directed antenna can receive.

The flight vehicle 1 may be an unmanned flight vehicle, as exemplified by an unmanned aerial vehicle, or it may be a manned flight vehicle. The flight vehicle 1 is preferably an unmanned flight vehicle, among others. By the flight vehicle 1 being an unmanned flight vehicle, the flight vehicle 1 does not require structures to accommodate a pilot or other personnel, as exemplified by a seat, windshields, and a pressurized structure, etc. Thus, the structure of the flight vehicle 1 can be made simpler than that of a manned flight vehicle. This may improve the maintainability, cost performance, or the like of the flight vehicle 1. Further, by the flight vehicle 1 being an unmanned flight vehicle, the flight vehicle 1 can fly for a long period of time without considering the fatigue of the pilot or other personnel. This may make it easier to perform the relaying process for longer period of time.

The flight vehicle 1 is preferably a multicopter. A multicopter is a rotorcraft having three or more rotors. A multicopter is capable of climbing and/or descending by increasing or decreasing the rotational speed of the rotors. A multicopter is also capable of tilting its body by making difference between the rotational speed of each rotors. This allows the multicopter to be capable of moving forward, backward, and/or turn, etc. Thus, the flight vehicle 1 is capable of moving to a predetermined position by climbing, descending, moving forward, moving backward, and/or turning.

When the flight vehicle 1 is a balloon, the position of the balloon can change due to wind effects. Changing the position of the balloon may cause that the position of the balloon differs from the predetermined position. The flight vehicle 1 being a multicopter is capable of controlling its flight state to counteract the effects of wind. Thus, the flight vehicle 1 being a multicopter is capable of keeping the predetermined position. By keeping the predetermined position, the flight vehicle 1 is capable of receiving information that is transmitted from a transmission antenna located in a farther location.

A fixed-wing aircraft is a flight vehicle obtains lift from fixed and/or variable wings. When the flight vehicle 1 is a fixed-wing aircraft, the fixed-wing aircraft must continue to move in order to obtain lift force from the fixed and/or variable wings. The movement of the fixed-wing aircraft may cause that the position of the fixed-wing aircraft differs from the predetermined position. A multicopter is more capable of hovering, which allows the multicopter keeping the same position in the air, than a fixed-wing aircraft obtaining lift force from fixed and/or variable wings. The flight vehicle 1 being a multicopter is capable of keeping the predetermined position. This allows the flight vehicle 1 to be capable of receiving information that is transmitted from a transmission antenna located in a farther location.

When the flight vehicle 1 is a fixed-wing aircraft, which obtains lift force from fixed and/or variable wings, the shape of the flight vehicle 1 may be required to be a shape being capable of obtaining enough lift force for the flight from the fixed and/or variable wings. If the flight vehicle 1 is a multicopter, which does not require fixed and/or variable wings, it is capable of preventing shape restrictions relating to the lift force obtained from fixed and/or variable wings. Thus, by the flight vehicle 1 being a multicopter, it is capable of satisfying the shape restrictions when the flight vehicle 1 mounts antennae 4.

[Controller 2]

The controller 2 is capable of controlling the transmitter 3 and one or more antennae 4. The controller 2 is also capable of executing a relaying process including at least: a process of receiving information by one or more antennae 4; and a process of outwardly transmitting said information by one or more antennae 4. The relaying process to be executed by the controller 2 is described in detail below with reference to FIG. 3. Inclusion of the controller 2 in the flight vehicle 1 makes it possible the flight vehicle 1 to execute the relaying process to relay the information.

The controller 2 is not specifically limited. The controller 2 may be a prior-art microcomputer including, for example, a CPU (Central Processing Unit), a RAM (Random Access Memory), and a ROM (Read Only Memory) or the like.

The controller 2 is configured to be able to acquire information received by the antennae 4. This makes it possible to execute the process of antennae 4 receiving information. The controller 2 is configured to control the transmitter 3 and antenna 4 to transmit information. This makes it possible to execute the process of transmitting information by antennae 4 through the transmitter 3.

The controller 2 is preferably configured to be able to control the direction of antennae 4, although it is not an essential aspect. Thus, the controller 2 is capable of controlling the direction of antennae 4 according to the source and/or destination of the information.

The controller 2 is preferably able to receive various instructions from a user who uses the flight vehicle 1 and/or the communication system C. Examples of various instructions include an instruction to control the flight state of the flight vehicle 1, and/or an instruction to change the direction of the antennae 4, or the like. Since the controller 2 is able to receive the various instructions from the user, the flight vehicle 1 may be controlled in response to the user's instruction.

The controller 2 is preferably able to use the electric power supplied by the power source 6. Thus, the controller 2 is capable of being operated using the electric power supplied by the power source 6.

[Transmitter 3]

The transmitter 3 is a transmitter capable of providing an analog signal that causes the antenna 4 to transmit information. The transmitter 3 is connected to the controller 2 and the one or more antennae 4. The transmitter 3 is configured to be able to provide the one or more antennae 4 with the analog signal in accordance with the control of the controller 2. The transmitter 3 is not specifically limited and may be a transmitter of the prior art. The transmitter 3 may be a transmitter including, for example, an oscillator that oscillates an analog signal and a modulator that modulates the analog signal or the like. Inclusion of the transmitter 3 makes it possible to transmit the information to the one or more antennae 4 via the analog signal.

The transmitter 3 may be configured integrally or configured separately with the controller 2. By the transmitter 3 being configured integrally with the controller 2, it is capable of a simple configuration that does not include wiring to connect the controller 2 to the transmitter 3. By the transmitter 3 being configured separately with the controller 2, the controller 2 and/or transmitter 3 can be configured more simply than when they are configured integrally. Hereinafter, description is given as the transmitter 3 is configured separately with the controller 2.

The Transmitter 3 is preferably able to use the electric power supplied by the power source 6. Thus, the transmitter 3 is capable of being operated using the electric power supplied by the power source 6.

[Antenna 4]

The antenna 4 is a linear array antenna that is capable of receiving information from the transmission antenna and transmitting information to the reception antenna in response to an analog signal provided by transmitter 3. Each of the one or more antennae 4 includes an antenna support 41, a plurality of antenna elements 42, one or more phase shifters 43, a synthesizer 44, and a converter 45. Each of the one or more antenna 4 is connected to the controller 2 and the transmitter 3. Each of the one or more antenna 4 is configured to be controllable by the controller 2. Each of the one or more antennae 4 is configured to be providable received information to the controller 2.

By inclusion of the one or more antennae 4, the flight vehicle 1 can execute relaying process, which receives the information from the transmission antennae and transmits said information to the reception antennae. The relaying process is described in detail below with reference to FIG. 3.

The lift forces that the flight vehicle 1 can generate, or other factors may limit the weight of the antenna mounted on the flight vehicle 1. According to the present embodiment, it is sufficient for the flight vehicle 1 to comprise one or more antennae 4, a controller 2, and the like. Thus, the weight limitation when antennae 4 are mounted on the flight vehicle 1 can be satisfied.

The aerodynamic characteristics required of the flight vehicle 1 and other factors may restrict the shape of the antenna 4 mounted on the flight vehicle 1. According to the present embodiment, it is sufficient for the flight vehicle 1 to comprise one or more antennae 4, a controller 2 and the like. Thus, the shape limitation when antennae 4 are mounted on a flight vehicle 1 can be satisfied.

There are linear directed antennae, exemplified by parabolic antennae and planar phased array antennae. Linear directed antennae can receive information transmitted from sources located in a linear range. In contrast to this, it is possible to use a linear array antenna by directing the linear array antenna to a conical range, a central axis of the conical range being a longitudinal direction of the antenna. The "conical range" as used herein is an area that includes a side surface of a cone and areas near the side surface and that does not include the bottom nor the inside of the cone.

Since the antenna 4 is a linear array antenna, it is possible to receive information transmitted by sources located in a conical range which is wider than a linear range. Further, it is possible to transmit information to destinations located in a conical range which is wider than a linear range.

The flight vehicle 1 is preferably able to include two or more antennae 4, although it is not an essential aspect. Inclusion of the two or more antennae 4 makes it possible the flight vehicle 1 to transmit information by using a different antenna 4 than the one receiving the information.

When the same antenna 4 is used to receive and transmit information at the same time, the information to be received and the information to be transmitted may be interfered at the antenna 4 which may adversely affect the reception and/or transmission. If the reception is adversely affected, the information transmitted from a transmission antenna located in a far position may not be received. If the transmission is adversely affected, the information may not be transmitted to a reception antenna located in a far position.

By transmitting information by using a different antenna 4 than the one receiving the information, it is possible to prevent interfering of receiving information and transmitting information at the antennae 4 when reception and transmission are performed simultaneously. Thus, it is possible to achieve both receiving information transmitted by the transmission antenna located in a far position and transmitting information to the reception antenna located in a far position. Therefore, by inclusion of the two or more antennae 4 and information transmission by using a different antenna 4 than the one receiving the information, the flight vehicle 1 is capable of relaying communication between a transmission antenna and a reception antenna that are located far from each other.

By inclusion of the two or more antennae 4, the flight vehicle 1 can execute a process that suitably receives information from two or more transmission antennae, wherein the number of the transmission antennae is two or more. The process that suitably receives information from two or more transmission antennae is described in detail below with reference to FIG. 6.

By inclusion of the two or more antennae 4, the flight vehicle 1 can execute a process that suitably transmit information to two or more reception antennae, wherein the number of the reception antennae is two or more. The process that suitably transmits information to two or more reception antennae is described in detail below with reference to FIG. 7.

The antennae 4 is preferably able to use the electric power supplied by the power source 6. Thus, the antennae 4 is capable of being operated using the electric power supplied by the power source 6. It is preferable that the number of the phase shifters 43 included in each of the one or more antennae 4 be any of the number being one smaller than the number of the antenna elements 42, the number being the same as the number of the antenna elements 42, or the number being larger than the number of the antenna elements 42, although it is not an essential aspect. Since the number of the phase shifters 43 is any of these numbers, the direction of antenna 4 may be controlled by controlling the phase of each of the plurality of the antenna elements 42. Hereinafter, description is given as both of the number of the phase shifters 43 included and the number of the antenna elements 42 in each of the one or more antennae 4 being a predetermined number "np".

FIG. 1 illustrates a first antenna 4a, a second antenna 4b, a third antenna 4c, and a fourth antenna 4d as the antennae 4 included by the flight vehicle 1. Each of the one or more antennae 4 is connected to the controller 2, the transmitter 3, and the power source 6 described below.

(About Information)

The information transmitted and/or received by the antenna 4 is not specifically limited. The information may include one or more of the various types of information exemplified by images, videos, text, symbols, and data used by computers. By the information including one or more of these various types of information, the antenna 4 is capable of relaying the various types of information.

The information is preferably capable of being transmitted and/or received by using radio waves. Since the information is capable of being transmitted and/or received by using radio waves, the antenna 4 is capable of transmitting and/or receiving information by transmitting and/or receiving radio waves. Hereinafter, description is given as the information is capable of being transmitted and/or received by using radio waves.

The information preferably includes information indicating that the information is to be relayed. This allows the controller 2 to determine which information is to be relayed and which is not, and to relay only the information that is to be relayed.

(Antenna Support 41)

The antenna support 41 is configured to be able to support various components included in the antennae 4, such as the plurality of antenna elements 42. This makes it possible to dispose each of the plurality of antenna elements 42 so as to configure a linear array antenna.

(Antenna Element 42)

The antenna element 42 is capable of receiving and/or transmitting information. The antenna element 42 is capable of providing the phase shifter 43 with the received analog signal including information. The antenna element 42 is capable of transmission of the information based on the analog signal provided by the phase shifter 43.

The antenna elements 42 are disposed in the antenna support 41 so as to configure a linear array antenna along the longitudinal direction of the antenna 4. It is possible to use a linear array antenna by directing the linear array antenna to a conical range, a central axis of the conical range being a longitudinal direction of the antenna. The "conical range" as used herein is an area that includes a side surface of a cone and areas near the side surface and that does not include the bottom nor the inside of the cone.

Since the antenna elements 42 are disposed to configure a linear array antenna, it is possible to receive information which is transmitted from sources located in a conical range which is wider than a linear range. Further, since the antenna elements 42 are disposed to configure a linear array antenna, it is possible to transmit information to destinations located in a conical range which is wider than a linear range.

The antenna element 42 is not specifically limited, and may be an antenna element configured by using a prior-art antenna capable of transmitting the information and receiving the information. If the information is capable of being transmitted and/or received by using radio waves, the antenna element 42 preferably includes an antenna capable of transmitting and receiving radio waves. Thus, it is capable of transmitting and/or receiving information that is capable of being transmitted and/or received by using radio waves at the antenna element 42.

If the information is capable of being transmitted and/or received by using radio waves, the antenna element 42 is preferably a substantially non-directive antenna element. The term "substantially no-directive" as used herein indicates that a gain of antenna element 42 is approximately the same regardless of the direction viewed from the antenna element 42. The gain as used herein is a ratio obtained by dividing the field intensity of the antenna element 42 in a direction viewed from the antenna element 42 by the field intensity in the case of an isotropic antenna element.

The upper limit of the gain in the substantially non-directive antenna element 42 is preferably 1.7 or lower, more preferably 1.5 or lower, and further preferably 1.3 or lower. By setting the upper limit of the gain as described above, it becomes even easier to receive the information from transmission antennae in all directions. By setting the upper limit of the gain as described above, it becomes even easier to transmit the information to reception antennae in all directions. If the information is capable of being transmitted and/or received by using radio waves, it is preferable that each of the plurality of antenna elements 42 be arranged with a predetermined arrangement gap $s_P[m]$. Thus, the direction of the antenna 4 may be controlled, by giving a predetermined phase difference $a_P$ to each of the phase of the radio wave transmitted by the two adjacent antenna elements 42.

FIG. 2 illustrates a first antenna element 42a, a second antenna element 42b, a third antenna element 42c, and a fourth antenna element 42d as the antenna elements 42 included in the antenna 4. Each of the antenna elements 42 is connected to each of the phase shifters 43 described below. Each of the antenna elements 42 is disposed so as to configure a linear array antenna along the longitudinal direction of the antenna 4.

(Phase Shifter 43)

The phase shifter 43 is a phase shifter that controls the phase of an analog signal provided by the antenna element 42 and provides it to the synthesizer 44 described below. The phase shifter 43 is also a phase shifter that controls the phase of an analog signal distributed by the synthesizer 44 and provides it to the antenna element 42. The phase shifter 43 is configured to be controllable by the controller 2. The phase shifter 43 is not specifically limited, and may be a phase shifter of the prior art. The phase shifter 43 allows that it is capable to controlling the phase of the information received and/or transmitted by the antenna element 42 to control the antenna 4 directing a conical direction.

The phase shifter 43 is not specifically limited, and may include a phase shifter of the prior art that is capable of controlling the phase of analog signals. By inclusion of a phase shifter that is capable of controlling the phase of analog signals, the phase shifter 43 is possible to control the phase with respect to the analog signal provided by the antenna element 42 and to provide it to the synthesizer 44. By inclusion of a phase shifter that is capable of controlling the phase of analog signals, the phase shifter 43 is also possible to control the phase of an analog signal distributed by the synthesizer 44 and provides it to the antenna element 42.

FIG. 2 illustrates a first phase shifter 43a, a second phase shifter 43b, a third phase shifter 43c, and a fourth phase shifter 43d, as the phase shifters 43 included in the antenna 4. Each of these phase shifters 43 is connected to each of the antenna elements 42. Each of these phase shifters 43 is also connected to the controller 2 and the synthesizer 44.

The phase shifter 43 is preferably able to use the electric power supplied by the power source 6. Thus, phase shifter 43 is capable of being operated using the electric power supplied by the power source 6.

(Synthesizer 44)

The synthesizer 44 is capable of synthesizing the phase-controlled analog signals provided by the phase shifters 43 and provide the synthesized analog signal to the converter 45 described below. If each of the analog signals provided through each of the plurality of phase shifters 43 is weak, the converters 45 may not be possible to convert the analog signals to digital signals. By inclusion of the synthesizer 44, even if each of the analog signals provided through each of the plurality of phase shifters 43 is weak, the synthesizer 44 may provide the converter 45 with a stronger analog signal being obtained by synthesizing these analog signals. Therefore, the converter 45 may convert the stronger analog signal into a digital signal.

The synthesizer 44 is also capable of distributing the analog signal provided by the transmitter 3 and provides them to each of the plurality of phase shifters 43. The synthesizer 44 being a signal distributor can provide the analog signals to each of the plurality of phase shifters 43 even if the transmitter 3 is not a transmitter capable of generating a plurality of analog signals simultaneously.

Hereinafter, a synthesizer also usable as a signal distributor is simply referred to as a "synthesizer" regardless of use thereof. The synthesizer 44 is not specifically limited, and may be a synthesizer of the prior art that is exemplified by, for example, a resistance synthesizer, a Wilkinson synthesizer, and a hybrid synthesizer or the like. The synthesizer 44 may be a synthesizer that includes a combination of two or more synthesizers.

(Converter 45)

The converter 45 is capable of converting the analog signal provided by the synthesizer 44 into a digital signal and provides the converted digital signal to the controller 2. This makes it possible to provide the controller 2 with the information in the form of the digital signal suitable for the relaying process executed in the controller 2. The converter 45 is not specifically limited, and may be a converter of the prior art which can convert an analog signal into a digital signal.

The converter 45 is preferably able to use the electric power supplied by the power source 6. Thus, the converter 45 is capable of being operated using the electric power supplied by the power source 6.

(Amplifier)

The antenna 4 preferably includes one or more amplifiers (not illustrated), although it is not an essential aspect. The amplifier is capable of amplifying analog signals. In general, an amplified analog signal is easier to analyze than an analog signal that is not amplified. Therefore, the amplifier may make it easier to perform analysis of the analog signals. Further, by inclusion of the amplifier, it is possible to transmit information based on a stronger analog signal that is amplified. The amplifier is not specifically limited, and may be an amplifier of the prior art. The amplifier is preferably able to amplify each of the analog signals that each of the phase shifters 43 provides to the synthesizer 44. Thus, the analog signals including information received may be stronger. Therefore, the converter 45 may convert the stronger analog signals into digital signals.

The amplifier is preferably able to amplify the analog signals provided by the synthesizer 44. Thus, if the intensity of the analog signals decreases due to the distribution in the synthesizer 44, the analog signals may be amplified and provided to the phase shifters 43. Then, it is possible to transmit the information based on the stronger analog signals.

When the amplifier is able to amplify the analog signal provided by the synthesizer 44, the number of amplifiers included in each of the one or more antennae 4 is preferably np or more. Thus, each of the analog signals provided by the synthesizer 44 may be amplified and provided to the np phase shifters 43.

The amplifier is preferably able to use the electric power supplied by the power source 6. Thus, amplifier is capable of being operated using the electric power supplied by the power source 6.

(Frequency Converter)

The antenna 4 preferably includes one or more frequency converters (not illustrated), although it is not an essential aspect. The frequency converter is capable of converting the frequency of the analog signal provided to the antenna element 42 and converting the frequency of the analog signal provided from the antenna element 42.

In general, processing an electric signal with a higher frequency makes a configuration of a member that processes the signal more complicated, which thus reduces the cost-effectiveness, or the like. With the frequency converter, the frequency of the analog signal processed by the transmitter 3, the phase shifters 43, the synthesizer 44, and/or the amplifier or the like may be made lower than the frequency of the radio wave including information to be transmitted. Therefore, the configuration of these components may be made simpler, and the cost-effectiveness and other aspects of the flight vehicle 1 can be improved.

The number of the frequency converters is preferably np or more. Since the number of the frequency converters is np or more, the frequency of each of analog signals based on the information received by the np antenna elements 42 may be converted. Thus, it may be possible to configure the synthesizer 44 and the converter 45 to process the frequency lower than the frequency of the analog signal. Further, the amplifier and/or the phase shifter 43 may be configured to process a frequency lower than the frequency of the analog signal. Since the number of the frequency converters is np or more, the frequency of each of analog signals distributed by the synthesizer 44 may be converted. Thus, it may be possible to configure the transmitter 3 and the synthesizer 44 to process the frequency lower than the frequency of the analog signals. Since the number of the frequency converters is np or more, it may also be possible to configure the phase shifter 43 and/or the amplifier to process the frequency lower than the frequency of the radio wave including information to be transmitted.

The frequency converter is not specifically limited, and may be a frequency converter of the prior art. The frequency converter may be a mixer that is exemplified by, for example, a mixer that converts the frequency of an analog signal by combining a predetermined periodic signal LO with the analog signal. By synthesizing the specific periodic signal LO and the analog signal, it is possible to convert the frequency of the analog signal into a frequency of a sum and/or a difference of the specific periodic signal LO and the frequency of the analog signal. The frequency converter is preferably able to use the electric power supplied by the power source 6. Thus, frequency converter is capable of being operated using the electric power supplied by the power source 6.

[Flying Structure 5]

Turn back to FIG. 1. The flying structure 5 is capable of providing lift force and/or buoyancy to the flight vehicle 1 to enable it to fly. The flying structure 5 is not specifically limited. The flying structure 5 is capable of controlling the flight state of the flight vehicle 1 in accordance with the control of the controller 2.

If the flight vehicle 1 is a balloon, the flying structure 5 is preferably including a balloon section that can accommodate gases lighter than air. By inclusion of a balloon section, the flight vehicle 1 can be flown by the buoyancy provided by gases lighter than air. If the flight vehicle 1 is a fixed-wing aircraft, the flying structure 5 preferably includes a propulsion unit capable of moving the flight vehicle 1 and fixed and/or variable wings capable of generating lift force in response to the movement of the flight vehicle 1. Thus, the flight vehicle 1 is capable of moving and generating lift force in response to this movement. This lift force can make the flight vehicle 1 fly.

If the flight vehicle 1 is a helicopter or the like that uses one or more rotors to obtain lift forces, the flying structure 5 preferably includes one or more drive parts 51 and one or more rotors 52 capable of being rotated by the drive parts 51. Thus, it is possible to rotate rotors 52 by using the drive parts 51 to obtain lift forces. This lift forces can make the flight vehicle 1 fly.

If the flight vehicle 1 is a multicopter that uses three or more rotors to obtain lift forces, the number of flying structure 5 is three or more, and each of the three or more flying structures 5 preferably includes a drive part 51 and a rotor 52 rotated by the drive part 51. Thus, it is possible to rotate the rotors 52 to provide lift forces. This lift forces can make the flight vehicle 1 fly. Inclusion of a rotor 52 in each of the three or more flying structures 5 make it possible to ascend and/or descend by increasing or decreasing the rotational speed of the rotor 52. A multicopter is also capable of tilting its body by making difference between the rotational speed of each rotors 52. Thus, the multicopter is capable of moving forward, backward, and/or turn, etc. Therefore, the flight vehicle 1 is capable of moving to a predetermined position by climbing, descending, moving forward, moving backward, and/or turning.

By inclusion of a drive part 51 and a rotor 52 in each of the three or more flying structures 5, the drive part 51 can directly rotate the rotor 52 without a power distribution device or the like to distribute the power. Thus, the flying structure 5 can be made simpler. Further, by drive part 51 directly rotating the rotor 52 without a power distribution device or the like, the flight state can be controlled by flying structure 5 with relatively simple control without a power distribution device.

Hereinafter, description is given as the flight vehicle 1 is a multicopter, the number of flying structures 5 is three or more, and each of the three or more flying structures 5 includes a drive part 51 and a rotor 52 rotated by the drive part 51.

The flying structure 5 is preferably able to use the electric power supplied by the power source 6. Thus, the flying structure 5 is capable of being operated using the electric power supplied by the power source 6.

FIG. 1 illustrates a first flying structure 5a, a second flying structure 5b, a third flying structure 5c, and a fourth flying structure 5d as the flying structures 5 included by the flight vehicle 1. Each of the one or more flying structures 5 is connected to the controller 2 and the power source 6 described below.

(Drive Part 51)

The drive parts 51 are illustrated as 51a, 51b, 51c and 51d in FIG. 1. The drive part 51 is not specifically limited as long as it is capable of being controlled by the controller 2 and it is capable of rotating the rotor 52. The drive part 51 preferably has a motor that uses electricity to rotate the rotor 52. By the drive 51 having a motor, the controller 2 is capable of controlling the drive 51 by relatively easy control via electricity. Thus, the rotation speed or the like of the rotor 52 can be controlled. This makes it easier that controller 2 controls the flight state of the flight vehicle 1. If the drive part 51 includes a motor, the drive part 51 is preferably able to use the electric power supplied by the power source 6. This allows the rotor 52 to be rotated using the electric power supplied by the power source 6.

(Rotor 52)

The rotors 52 are illustrated as 52a, 52b, 52c and 52d in FIG. 1. The rotor 52 is not specifically limited as long as that can be rotated by the drive part 51 and can generate lift force by their rotation. The rotor 52 may be, for example, a variable pitch rotor that allows the tilt of the rotor relative to the direction of rotation to be varied. By the rotor 52 being a variable pitch rotor, it is capable of changing the tilt of the rotor blade in accordance with the rotation speed to efficiently obtain lift force. The rotor 52 may be, for example, a fixed pitch rotor where the tilt of the rotor blade relative to the direction of rotation is constant. By the rotor 52 being a fixed pitch rotor, the rotor 52 can be configured more simply than when they are configured a variable pitch rotor blade. This may improve the maintainability, cost-effectiveness, or the like of the flight vehicle 1.

[Power Source 6]

The power source 6 is capable of supplying electric power to one or more of the components and other parts that the flight vehicle 1 has, such as the controller 2, the transmitter 3, the antenna 4, and the flying structure 5. The power source 6 is not specifically limited, and may be a power source of the prior art. The power source 6 may be, for example, a primary battery (e.g., dry cell, wet cell, etc.), a secondary battery, a solar cell, a fuel cell, a nuclear battery, an all-solid battery, a generator (e.g., a generator using an internal and/or external combustion engine, a microwave generator, etc.), and a power supply including one or more of these.

Among other things, the power source 6 preferably includes a battery exemplified by a primary battery, a secondary battery, and an all-solid battery. A battery has a simpler structure than a generator or other devices. Therefore, by the power source 6 including a battery, the power source 6 can be configured more simply. This may improve the maintainability, cost-effectiveness, or the like of the flight vehicle 1.

[Support Structure 7]

The support structure 7 is not specifically limited as long as it is capable of supporting two or more components of the flight vehicle 1 in a predetermined positional relationship. The support structure 7 may be, for example, a structure which is capable of supporting the antenna 4 and the flying structure 5 in a predetermined positional relationship.

FIG. 1 illustrates the support structure 7 included by the flight vehicle 1, wherein the support structure 7 supports the controller 2, the transmitter 3, the first antenna 4a, the second antenna 4b, the third antenna 4c, the fourth antenna 4d, the first flying structure 5a, the second flying structure 5b, the third flying structure 5c, the fourth flying structure 5d, and the power source 6 in a predetermined position. By inclusion of the support structure 7, it is capable of supporting them so that each of them is supported in a predetermined positional relationship.

[Transmission Antenna]

The transmission antenna included in the communication system C is an antenna capable of transmitting information and is illustrated as T1 or the like in FIG. 1. The transmission antenna is not specifically limited and may be an antenna of the prior art. The transmission antenna may be, for example, a dipole antenna, a Yagi antenna, a single wire fed antenna, a loop antenna, an array antenna, a grounded antenna, an ungrounded vertical antenna, a beam antenna, a horizontally polarized omnidirectional antenna, a plate antenna, a planar antenna, a horn antenna, a parabolic antenna, a spherical antenna, a lens antenna, a traveling wave antenna, or an antenna containing one or more of these.

The transmission antenna may be an antenna installed on the ground, an antenna installed on a building, an antenna installed on a portable device carried by a user, an antenna installed on a moving object such as a vehicle. The transmission antenna may be an antenna installed on various flying vehicle as exemplified by balloons, airships, helicopters, and fixed-wing aircraft, etc. The transmission antenna may be an antenna installed on an artificial satellite. The transmission antenna may be an antenna 4 provided by a different flight vehicle 1 than the one executing the relaying process.

[Reception Antenna]

The reception antenna included in the communication system C is an antenna capable of receiving information and is illustrated as R1 or the like in FIG. 1. The reception antenna is not specifically limited and may be an antenna of the prior art similar to the transmission antenna. The reception antennae and the transmission antennae may differ from each other. Thus, the flight vehicle 1 is capable of relaying information that is transmitted from the transmission antennae to the reception antennae.

The reception antenna may be an antenna installed on the ground, an antenna installed on a building, an antenna installed on a portable device carried by a user, an antenna installed on a moving object such as a vehicle. The reception antenna may be an antenna installed on various flying vehicle as exemplified by balloons, airships, helicopters, and fixed-wing aircraft, etc. The reception antenna may be an antenna installed on an artificial satellite. The reception antenna may be an antenna 4 provided by a different flight vehicle 1 than the one executing the relaying process.

[Flowchart]

Figure 3:
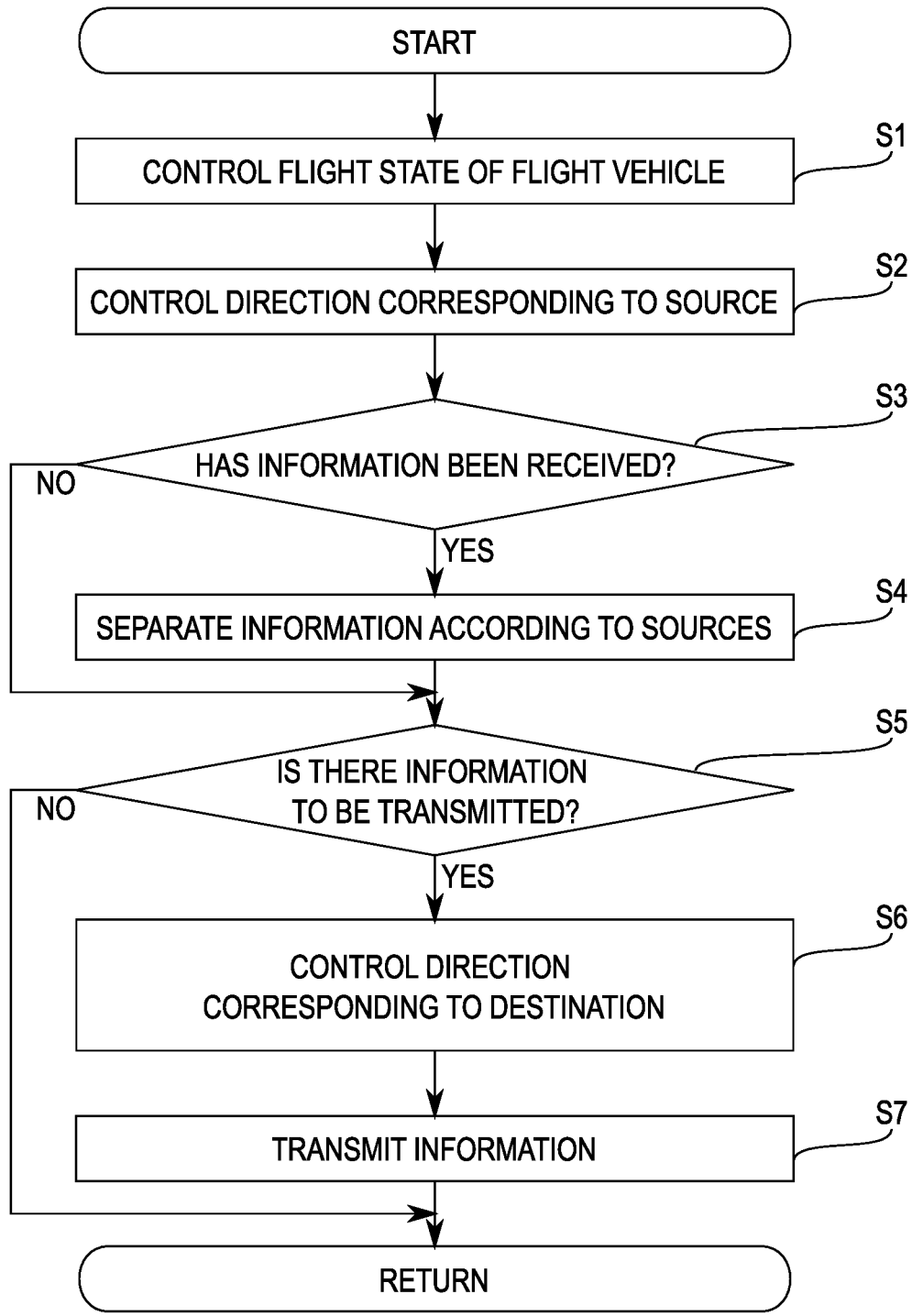
FIG. 3 is a flowchart illustrating an example of a preferred flow of a relaying process to be executed by a controller 2.

FIG. 3 is a flowchart illustrating an example of a preferred flow of a relaying process to be executed by a controller 2. Hereinafter, with reference to FIG. 3, description is given of an example of a preferred procedure of the relaying process executed by the controller 2.

[Step S1: Control the Flight State of the Flight Vehicle].

The controller 2 controls the flight state of the flight vehicle 1 through the control of the flying structure 5 so that the flight vehicle 1 positions to be a predetermined position where it can favorably receive the radio waves (step S1). The controller 2 shifts the process to step S2. By controlling the flight state of the flight vehicle 1 so that the flight vehicle 1 positions to be a predetermined position, the radio waves can be received in an appropriate manner.

Although this is not an essential aspect, the controller 2 preferably executes a process of controlling the direction to be directed corresponding to the source of transmission illustrated in step S2.

[Step S2: Control the Direction Corresponding to the Source].

The controller 2 controls the direction of the antenna 4 receiving information corresponding to the source(s) of the information (step S2). The controller 2 shifts the process to step S2. Therefore, the process executed in step S2 is capable of making the direction of the antenna 4 to align the source(s) of the information. This means that information transmitted from the source(s) of the information can be received suitably.

Although this is not an essential aspect, the process of controlling the direction of the antenna 4 corresponding to the source of the information preferably includes a process of controlling the direction of the antenna 4 that receives the information into a direction from said antenna 4 toward the source of the information. Thus, it is capable of receiving information that is transmitted from a source located in farther location.

Although this is not an essential aspect, when the number of transmission antennae is two or more, the process of controlling the direction of the antenna 4 corresponding to the source of the information preferably includes: a process of controlling the direction of one or more antenna 4 into a direction from said antenna 4 toward one of the transmission antennae, and a process of controlling the direction of one or more antenna 4 that differs from said one or more antennae into a direction from said antenna 4 toward a transmission antenna that differs from said transmission antenna.

This makes it possible to divide the antennae 4 receiving information into a plurality of groups corresponding to each of the plurality of transmission antennae. Then, it is possible to control the direction of antennae 4 in each of these groups to the direction corresponding to each of the plurality of transmission antennae. Thus, even if the number of transmission antennae is two or more, it is capable of controlling the direction of at least some of the antennae 4 receiving information to the direction from the antennae 4 toward the source of the information, so that it is possible to receive information which is transmitted from the transmission antennae located farther.

[Step S3: Determine Whether or Not Information has Been Received]

The controller 2 determines whether or not information has been received (step S3). If information has been received, the controller 2 acquires the information received by the antennae 4, then shifts the process to step S4. If information has not been received, the controller 2 shifts the process to step S5. Determining whether or not information has been received allows to acquire the information received by the antenna 4 when it has been received. It also allows to execute a process of separating information according to the source of the information when it has been received.

Although this is not an essential aspect, the controller 2 preferably executes a process of separating information according to the source of the information illustrated in step S4.

[Step S4: Separate Information According to the Sources]

The controller 2 separates information according to the sources (step S4). The controller 2 shifts the process to step S5. This allows to separate information according to the sources so that the information can be received suitably even if each of the information to be received is transmitted by transmission antennae located at different directions. Therefore, each of the information transmitted by transmission antennae located at different directions may be received more reliably.

[Step S5: Determine Whether or Not There is Information to be Transmitted]

The controller 2 determines whether or not there is information to be transmitted (step S5). If there is information to be transmitted, the controller 2 shifts the process to step S6. If there is not information to be transmitted, the controller 2 shifts the process to step S1 and repeats the processing of steps S1 to S7. By determining whether or not there is information to be transmitted, the process of transmitting the information can be executed if there is information to be transmitted among the acquired information.

The method of determining whether or not there is information to be transmitted among the acquired information is not specifically limited. The method of determining whether or not there is information to be transmitted among the acquired information may be, for example, a method of determining the information received from the transmission antenna specified by the user of the communication system C as the information to be transmitted. This allows the information received from the transmission antenna specified by the user of the communication system C to be relayed. The method of determining whether or not there is information to be transmitted among the acquired information may be, for example, a method of determining the information containing information indicating that it is information to be relayed as the information to be transmitted. Thus, the information to be relayed can be relayed.

Although this is not an essential aspect, the controller 2 preferably executes a process of controlling the direction to be directed corresponding to the destination illustrated in step S6.

[Step S6: Control the Direction Corresponding to the Destination]. The controller 2 controls the direction of the antenna 4 transmitting information corresponding to the destination(s) of the information (step S6). The controller 2 shifts the process to step S7. The process executed in step S6 allows the direction of the antenna 4 to be aligned to the destination(s) of the information. This allows the information to be transmitted to the destination(s) in an appropriate manner.

Although this is not an essential aspect, the process of controlling the direction of the antenna 4 transmitting information corresponding to the destination(s) of the information preferably includes a process of controlling the direction of the antenna 4 transmitting information into the direction from said antenna 4 toward the reception antenna that is the destination of the information. Thus, it is capable of transmitting information to destinations located in farther location.

Although this is not an essential aspect, when the number of reception antennae is two or more, the process of controlling the direction of the antenna 4 corresponding to the destination(s) of the information preferably includes a process of controlling the direction of one or more antenna 4 into a direction from said antenna 4 toward one of the reception antennae and a process of controlling the direction of one or more antenna 4 that differs from said one or more antennae into a direction from said antenna 4 toward a reception antenna that differs from said reception antenna.

This makes it possible to divide the antennae 4 transmitting information into a plurality of groups corresponding to each of the plurality of reception antennae. Then, it is possible to control each of the directions of antennae 4 in each of these groups to the direction corresponding to each of the reception antennae. Thus, even if the number of reception antennae is two or more, it is capable of controlling the direction of at least some of the antennae 4 transmitting information to the direction from the antennae 4 toward the destination of the information, so that it is possible to transmit information to the reception antennae located farther.

[Step S7: Transmit Information].

The controller 2 controls the transmitter 3 and antenna 4 so as to transmit the information to be transmitted (step S7). The controller 2 shifts the process to step S1 and repeats the processing of steps S1 to S7. By the controller 2 controlling the transmitter 3 and antenna 4 so as to transmit the information to be transmitted, it is possible to transmit the information that is to be transmitted among the information received to the reception antenna that is the destination of the information. Thus, the information transmitted by the transmission antenna can be relayed to the reception antenna.

Although this is not an essential aspect, the controller 2 preferably control the transmitter 3 and/or antennae 4 so that an antenna 4 that differs to the antenna 4 receiving information in the step S3 transmits information.

When the same antenna 4 is used to receive and transmit information at the same time, the information to be received and the information to be transmitted may be interfered at the antenna 4 which may adversely affect the reception and/or transmission. When the reception is adversely affected, the information transmitted from a transmission antenna located in a far position may not be received. When the transmission is adversely affected, the information may not be transmitted to a reception antenna located in a far position.

By controlling the transmitter 3 and/or antennae 4 so that an antenna 4 that differs to the antenna 4 receiving information in the step S3 transmits information, the antenna 4 receiving information and the antenna 4 transmitting the information differ from each other. Thus, it is possible to prevent interfering of receiving information and transmitting information at the antennae 4 when reception and transmission are performed simultaneously. Thus, it is possible to achieve both receiving information transmitted by the transmission antenna in a far position and transmitting information to the reception antenna in a far position. Therefore, it is possible to relay information between the transmission antennae and the reception antennae that are located farther from each other.

Usage Examples

Figure 4:
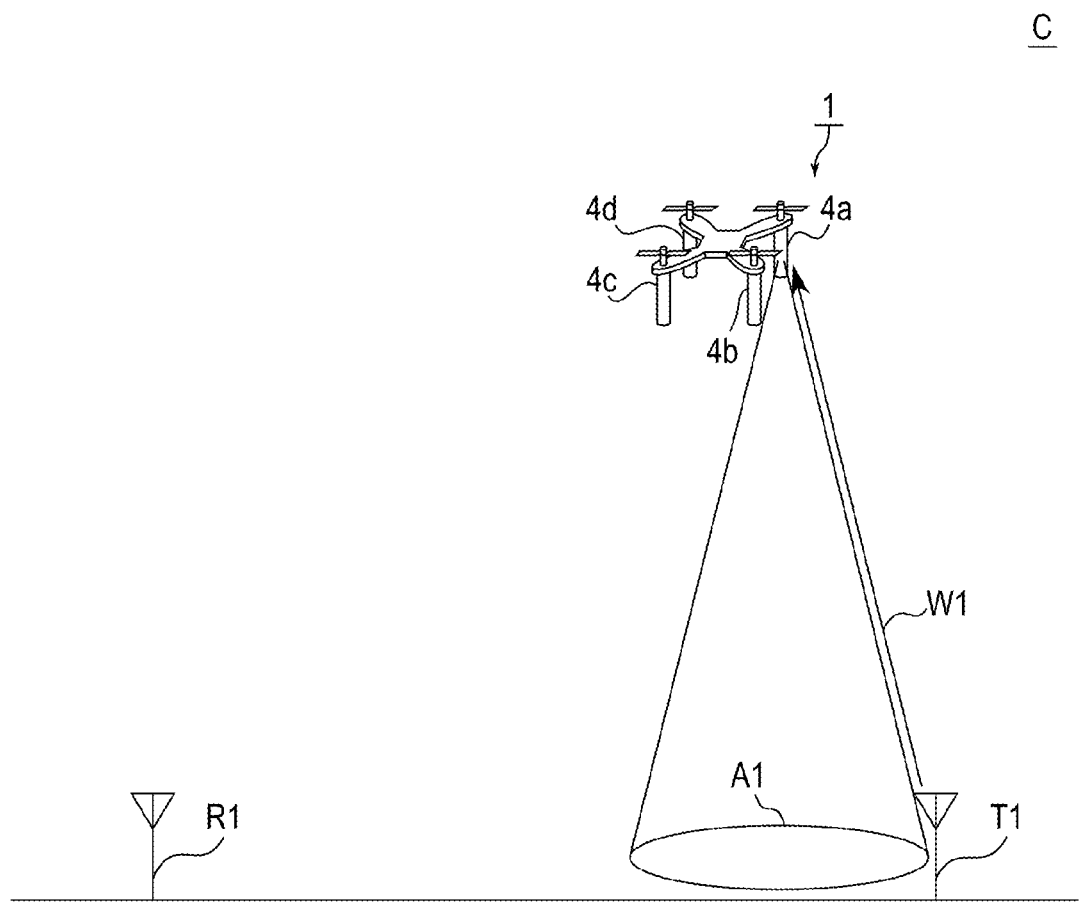
FIG. 4 is a conceptual diagram of the process of receiving information by directing the antenna 4.
Figure 5:
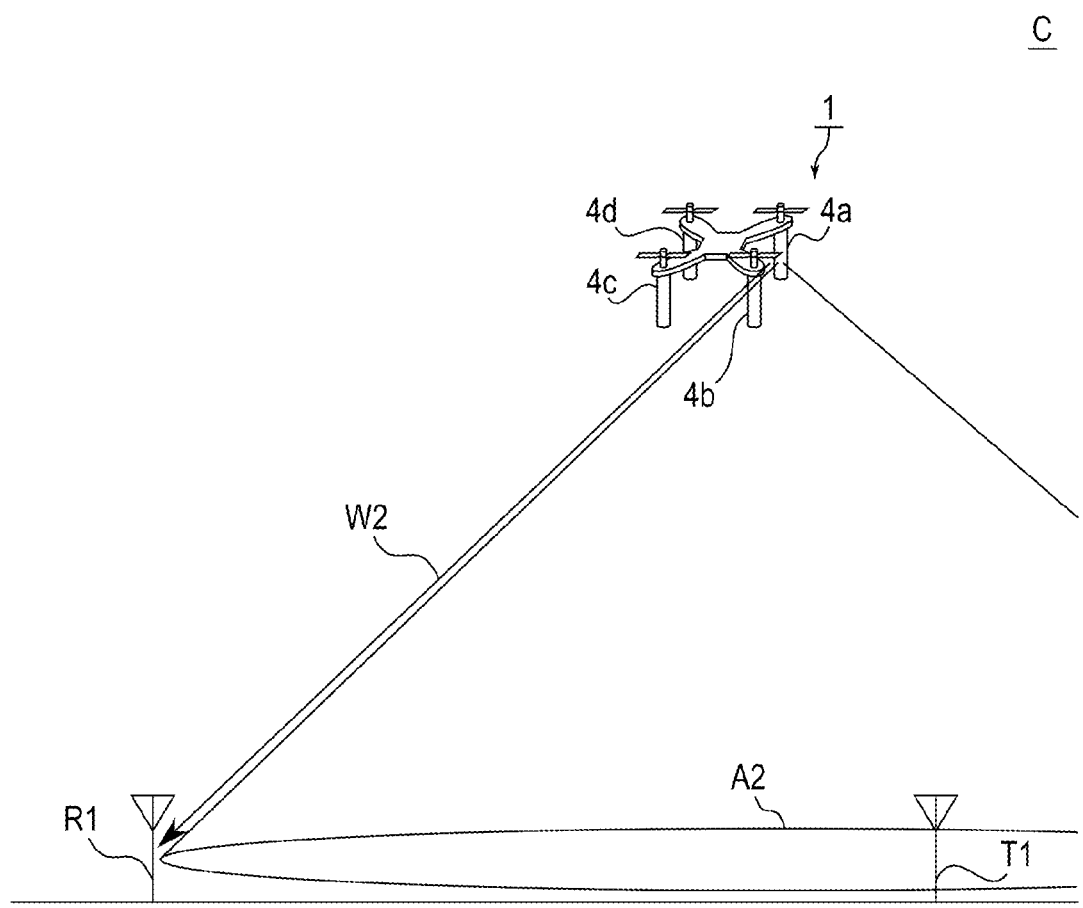
FIG. 5 is a conceptual diagram of the process of transmitting information by directing the antenna 4.
Figure 6:
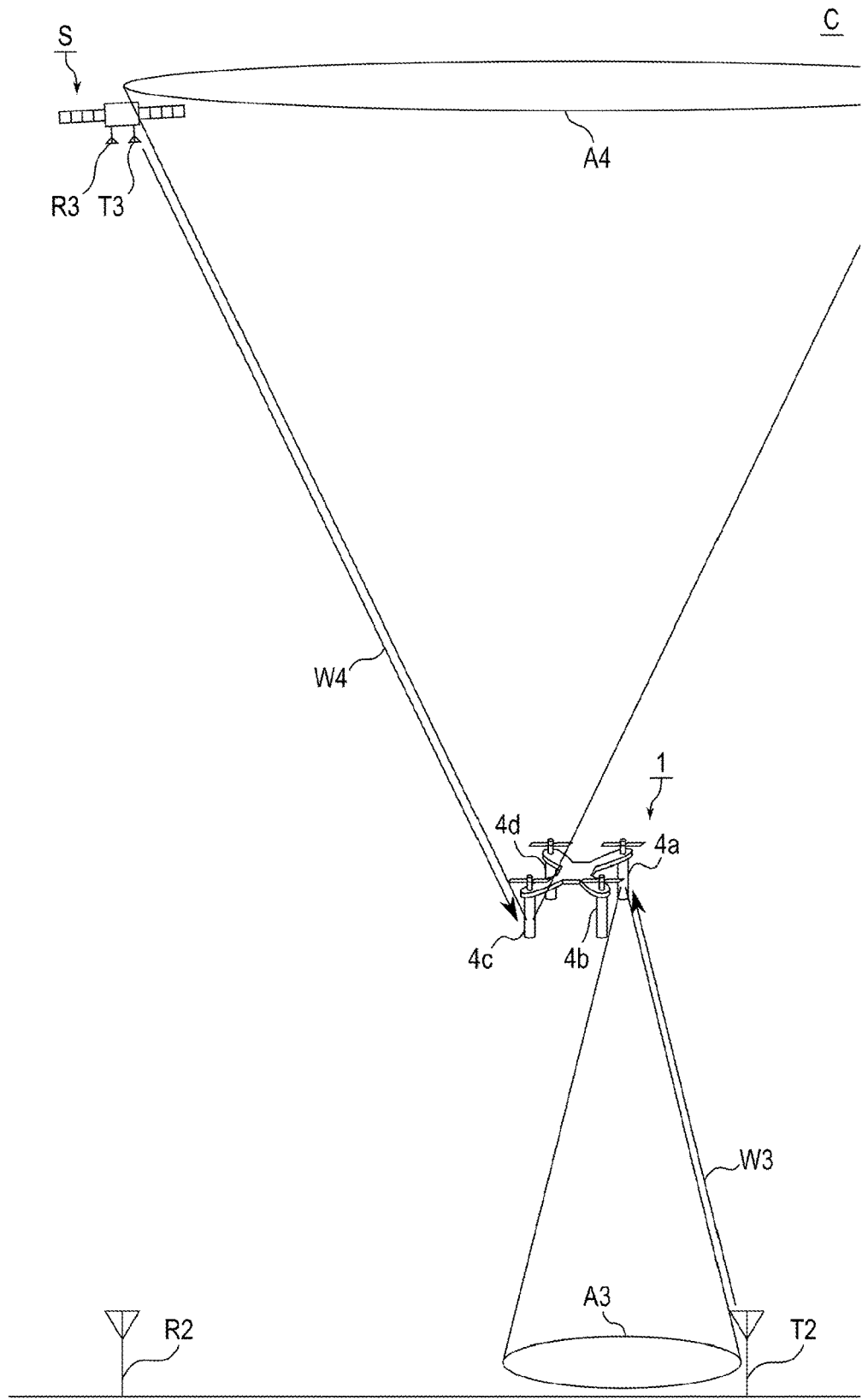
FIG. 6 is a conceptual diagram of the process of receiving information from a plurality of transmission antennae T.
Figure 7:
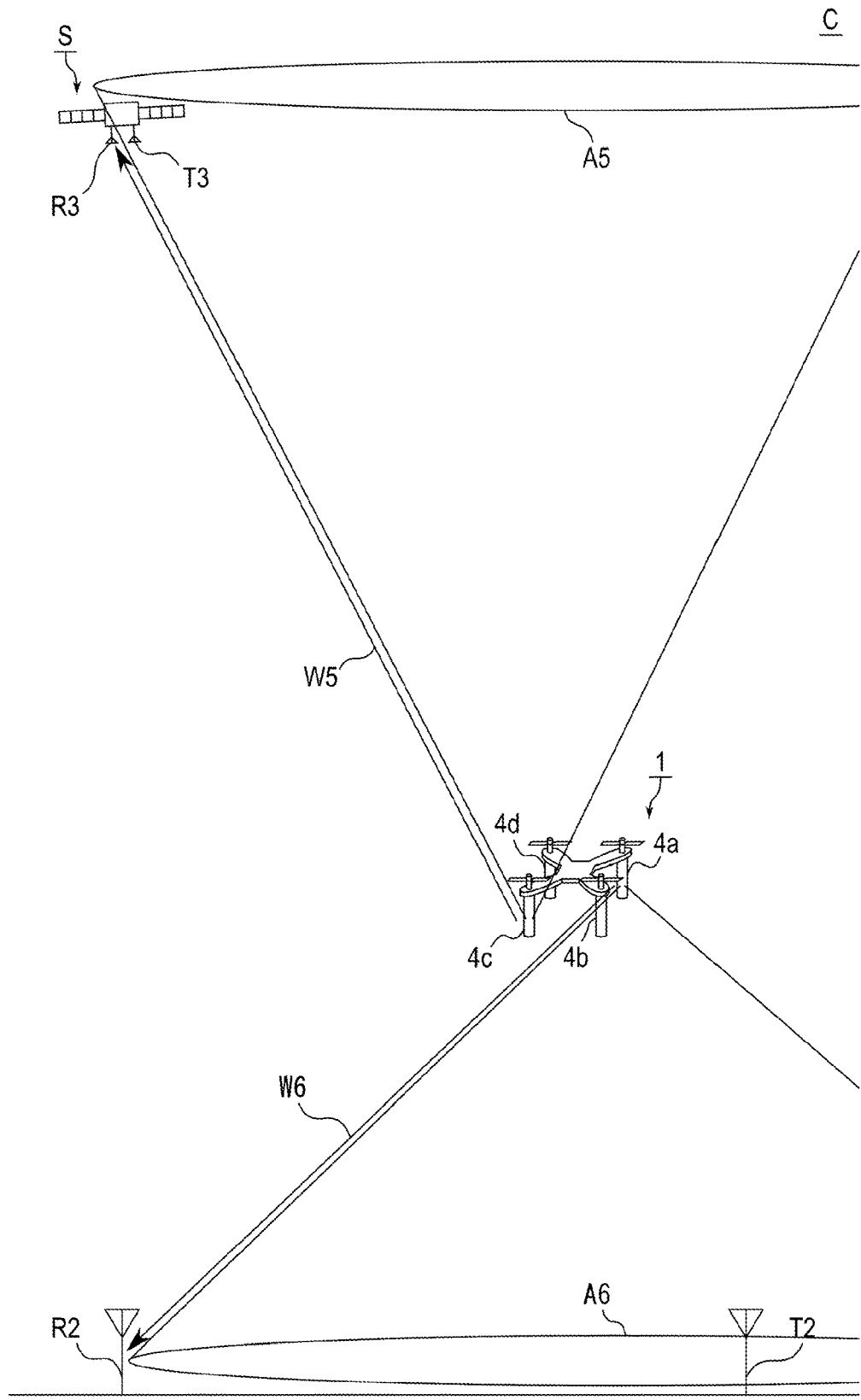
FIG. 7 is a conceptual diagram of the process of transmitting information to a plurality of reception antennae R.

FIG. 4 is a conceptual diagram of the process of receiving information by directing the antenna 4. FIG. 5 is a conceptual diagram of the process of transmitting information by directing the antenna 4. FIG. 6 is a conceptual diagram of the process of receiving information from a plurality of transmission antennae T, which includes the second transmission antenna T2 and the third transmission antenna T3. FIG. 7 is a conceptual diagram of the process of transmitting information to a plurality of reception antennae R, which includes the second reception antenna R2 and the third reception antenna R3. Hereinafter, description is given of usage examples of the flight vehicle 1 in the present embodiment with reference to FIG. 4 to FIG. 7, where appropriate.

[Control the Flight State]

The user of the flight vehicle 1 instructs to control the flight state of the flight vehicle 1 so that the flight vehicle 1 positions a predetermined position that can favorably receive the radio waves. The flight vehicle 1 controls the flight state of the flight vehicle 1 through the control of the flying structure 5 so that the flight vehicle 1 positions a predetermined position.

[Receive the Information]

The first transmission antenna T1 transmits the first radio wave W1 including information (FIG. 4). The flight vehicle 1 controls the direction of the first antenna 4a to a direction from the first antenna 4a toward the first transmission antenna T1. The direction of the first antenna 4a becomes a direction capable of easily receiving the information transmitted by the first transmission antenna T1 that is in the first conical range A1 illustrated in FIG. 4. The first antenna 4a receives the first radio wave W1.

Since the first antenna 4a is a linear array antenna, it can receive the information from the first transmission antenna T1 in the first conical range A1. The first conical range A1 is wider than a linear range due to a conical range. Therefore, it is possible to receive information transmitted from the transmission antenna located in wider range than a linear directed antenna can.

[Transmit the Information]

The flight vehicle 1 controls the direction of the first antenna 4a to a direction from the first antenna 4a toward the first reception antenna R1 illustrated in FIG. 5. The direction of the first antenna 4a becomes a direction capable of easily transmitting the information to the first reception antenna R1 that is in the second conical range A2 illustrated in FIG. 5. The first antenna 4a transmits the second radio wave W2 including the information transmitted from the first transmitting antenna T1. The first reception antenna R1 receives the second radio wave W2.

Since the first antenna 4a is a linear array antenna, it can transmit the information to the first reception antenna R1 in the second conical range A2. Therefore, it is possible to transmit information to reception antennae located in a wider range than a linear directed antenna can.

The first antenna 4a is an antenna mounted on the flight vehicle 1. This allows to prevent the first radio wave containing the information to be received and/or the second radio waves W2 containing the information to be transmitted from being interfered by shields. Therefore, according to the flight vehicle 1 of the present embodiment, it is possible to relay information between the first transmission antenna T1 and the first reception antennae R1 even if the antennae T1 and R1 differ each other and these antennae are located farther from each other.

Hence, according to the present embodiment, it is possible to provide a communication system C that can relay communication between a transmission antenna and a reception antenna located far from each other, using antennae capable of receiving information transmitted from a transmission antenna located in a wider range than a range where a linear directed antenna can receive.

[Receive Information From a Plurality of Transmission Antennae]

The second transmission antenna T2 transmits the third radio wave W3 including information. The third transmission antenna T3 mounted on an artificial satellite S transmits the fourth radio wave W4 including information (FIG. 6).

The flight vehicle 1 controls the direction of the first antenna 4a to a direction from the first antenna 4a toward the second transmission antenna T2. The direction of the first antenna 4a becomes a direction capable of easily receiving the information transmitted by the second transmission antenna T2 that is in the third conical range A3 illustrated in FIG. 6. The flight vehicle 1 controls the direction of the third antenna 4c to a direction from the third antenna 4c toward the third transmission antenna T3. The direction of the third antenna 4C becomes a direction capable of easily receiving the information transmitted by the third transmission antenna T3 that is in the fourth conical range A4 illustrated in FIG. 6. The first antenna 4a receives the third radio wave W3. The third antenna 4c receives the fourth radio wave W4.

Since each of the directions of a plurality of antennae 4 are capable of being controlled to directions corresponding to each of a plurality of transmission antennae T, even if the number of the transmission antennae T is two or more, it is possible to control the direction of at least some of the antennae 4 receiving information to the direction from the antennae 4 toward the source of the information, so that it is possible to receive information which is transmitted from transmission antenna located farther.

Since each of the directions of a plurality of antennae 4 are capable of being controlled to directions corresponding to each of a plurality of transmission antennae T, it is also capable of easily receiving the information transmitted from the second transmission antenna T2 and the third transmission antenna T3, even if the transmission antennae T are the second transmission antenna T2 located on the ground and the third transmission antenna T3 mounted by the artificial satellite S (FIG. 6).

[Transmit the Information to a Plurality of Reception Antennae]

The third reception antenna R3 is an antenna mounted on the artificial satellite S. The flight vehicle 1 controls the direction of the third antenna 4c to a direction from the third antenna 4c toward the third reception antenna R3. The flight vehicle 1 controls the direction of the first antenna 4a to a direction from the first antenna 4a toward the second reception antenna R2 (FIG. 7).

The direction of the third antenna 4c becomes a direction capable of easily transmitting the information to the third reception antenna R3 that is in the fifth conical range A5 illustrated in FIG. 7. The direction of the first antenna 4a becomes a direction capable of easily transmitting the information to the second reception antenna R2 that is in the sixth conical range A6 illustrated in FIG. 7.

The third antenna 4c transmits the fifth radio wave W5 including the information transmitted from the second transmission antenna T2. The third reception antenna R3 receives the fifth radio wave W5. The first antenna 4a transmits the sixth radio wave W6 including the information transmitted from the third transmission antenna T3. The second reception antenna R2 receives the sixth radio wave W6.

Since each of the directions of a plurality of antennae 4 are capable of being controlled to directions corresponding to each of a plurality of reception antennae R, it is possible to control the direction of at least some of the antennae 4 transmitting information to the direction from the antennae 4 toward the destination of the information, so that it is possible to receive information to reception antennae R located farther.

Further, since each of the directions of a plurality of antennae 4 are capable of being controlled to directions corresponding to each of a plurality of reception antennae R, it is capable of easily transmitting the information to the second reception antenna R2 and the third reception antenna R3 even if the second reception antenna R2 located on the ground and the third reception antenna R3 mounted by the artificial satellite S (FIG. 7).

Although the respective embodiments of the present invention have been described above, the present invention is not limited to the aforementioned embodiments. In addition, the effects described in the aforementioned various embodiments merely recite the most preferred effects derived from the present invention, and the effects of the present invention are not limited to those described in the aforementioned various embodiments. In addition, the aforementioned various embodiments have been described in detail to explain the present invention in an easy-to-understand manner, and are not necessarily limited to those having all the described configurations. Further, for one embodiment, it is possible to replace some of a configuration thereof with a configuration of another embodiment. Moreover, for one embodiment, it is also possible to add the configuration of another embodiment to the configuration thereof.

<Statements Pertaining to the Results of Research Entrusted by the National Government and the Like>

The present application is a patent application subject to Article 17 of the Industrial Technology Enhancement Law of Japan related to a research and development consignment project in the field of information and communication (Strategic Information and Communications R&D Promotion Programme) of the Ministry of Internal Affairs and Communications of Japan.

DESCRIPTION OF THE REFERENCE NUMERALS

1 Flight vehicle
2 Controller
3 Transmitter
4 Antenna
41 Antenna support
42 Antenna element
43 Phase shifter
44 Synthesizer
45 Converter
5 Flying structure
51 Drive part
52 Rotor
6 Power source
7 Support structure
A Conical range
C Communication system
R Reception antenna
S Artificial satellite
T Transmission antenna
W Radio wave

The invention claimed is:

1. A flight vehicle comprising:
one or more linear array antennae; and a controller, wherein the controller is configured to be capable to execute:
a process of receiving information by one or more antennae of said linear array antennae,
a process of outwardly transmitting said information by one or more antennae of said linear array antennae,
wherein the process of receiving information includes a process of controlling a direction of the one or more antennae that receives the information toward a direction of an antenna that is a source(s) of the information.

2. A flight vehicle comprising:
one or more linear array antennae; and a controller, wherein the controller is configured to be capable to execute:
a process of receiving information by one or more antennae of said linear array antennae,
a process of outwardly transmitting said information by one or more antennae of said linear array antennae,
wherein the process of outwardly transmitting includes a process of controlling a direction of the one or more antennae that transmits the information toward a direction of an antenna that is a destination(s) of the information.

3. The flight vehicle according to claim 1, being a multicopter.

4. A communication system comprising:
one or more transmission antennae capable of transmitting information;
the flight vehicle according to claim 1, wherein the flight vehicle capable of receiving said information from the transmission antennae and transmitting outwardly said information received; and
one or more reception antennae capable of receiving said information transmitted from the flight vehicle,
wherein the transmission antennae and the reception antennae differ from each other.

5. The communication system according to claim 4, wherein the number of transmission antennae is two or more, and the process of receiving includes:
a process of controlling a direction of one or more antennae of said linear array antennae receiving said information toward a direction of one of said transmission antennae,
a process of controlling a direction of a first of the one or more linear array antennae receiving first information toward a first transmission antenna, and controlling a direction of a second of the one or more linear array antennae receiving second information toward a second transmission antenna.

6. The communication system according to claim 4, wherein the number of reception antennae is two or more, and the process of transmitting includes:
a process of controlling a direction of one or more antennae of said linear array antennae transmitting said information toward a direction of one of said reception antennae,
a process of controlling a direction of a first of the one or more linear array antennae transmitting first information toward a first reception antenna, and controlling a direction of a second of the one or more linear array antennae transmitting second information toward a second reception antenna.

7. The communication system according to claim 6, wherein transmission of the first information and the second information to respective first and second reception antennae occurs concurrently.

8. The flight vehicle according to claim 1,
wherein the linear array antenna includes one or more phase shifter(s) capable of controlling the direction of said linear array antenna; and
the process of receiving and/or transmitting includes a process of controlling a direction of said linear antenna into a conical direction using said one or more phase shifter(s).

9. The flight vehicle according to claim 2,
wherein the linear array antenna includes one or more phase shifter(s) capable of controlling the direction of said linear array antenna; and
the process of receiving and/or transmitting includes a process of controlling the direction of said linear antenna into a conical direction using said one or more phase shifter(s).

10. The flight vehicle according to claim 3,
wherein the linear array antenna includes one or more phase shifter(s) capable of controlling the direction of said linear array antenna; and
the process of receiving and/or transmitting includes a process of controlling the direction of said linear antenna into a conical direction using said one or more phase shifter(s).

11. The flight vehicle according to claim 1, wherein the linear array antennae that receives the information and the linear array antennae that transmits the information differ from each other.

12. The flight vehicle according to claim 2, wherein the linear array antennae that receives the information and the linear array antennae that transmits the information differ from each other.

13. The flight vehicle according to claim 3, wherein the linear array antennae that receives the information and the linear array antennae that transmits the information differ from each other.

14. A communication system comprising:
one or more transmission antennae capable of transmitting information;
the flight vehicle according to claim 2, wherein the flight vehicle capable of receiving said information from the transmission antennae and transmitting outwardly said information received; and
one or more reception antennae capable of receiving said information transmitted from the flight vehicle,
wherein the transmission antennae and the reception antennae differ from each other.

15. A communication system comprising:
one or more transmission antennae capable of transmitting information;
the flight vehicle according to claim 3, wherein the flight vehicle capable of receiving said information from the transmission antennae and transmitting outwardly said information received; and
one or more reception antennae capable of receiving said information transmitted from the flight vehicle,
wherein the transmission antennae and the reception antennae differ from each other.

* * * * *